United States Patent [19]
DeVore

[11] Patent Number: 5,431,488
[45] Date of Patent: Jul. 11, 1995

[54] EARLY ACTIVATION RECOVERY CONTROL METHOD AND SYSTEM FOR VEHICLE ANTI-LOCK BRAKE SYSTEM

[75] Inventor: James H. DeVore, Canton, Mich.

[73] Assignee: Kelsey-Hayes Co., Romulus, Mich.

[21] Appl. No.: 100,127

[22] Filed: Jul. 30, 1993

[51] Int. Cl.⁶ .............................................. B60T 8/88
[52] U.S. Cl. .................................. 303/92; 303/100; 364/426.02
[58] Field of Search ............... 303/92, 100, 102, 103, 303/108, 109; 364/426.02

[56] References Cited

U.S. PATENT DOCUMENTS

| | | | |
|---|---|---|---|
| 4,739,484 | 4/1988 | Fennel | 303/103 X |
| 4,883,325 | 11/1989 | Shimanaki et al. | 303/103 X |
| 4,917,444 | 4/1990 | Ishido et al. | 303/100 |
| 5,273,350 | 12/1993 | Yagi | 303/100 X |

*Primary Examiner*—Robert J. Oberleitner
*Assistant Examiner*—Lee W. Young
*Attorney, Agent, or Firm*—Brooks & Kushman

[57] ABSTRACT

A control method and system for a vehicle anti-lock brake system to provide for recovery from premature activation of the vehicle anti-lock brake system. The control method includes the steps of determining whether the anti-lock brake system has prematurely activated, and engaging a premature activation recovery control of the anti-lock brake system when the anti-lock brake system has prematurely activated. The control system includes a wheel speed sensor for measuring the speed of at least one vehicle wheel, and a control unit for determining whether the anti-lock brake system has prematurely activated. The control system also includes a signal generator for generating a signal operative to increase brake fluid pressure to a vehicle wheel brake when the anti-lock brake system has prematurely activated, and for generating a signal operative to terminate brake fluid pressure increase when the anti-lock brake system has recovered from premature activation.

16 Claims, 4 Drawing Sheets

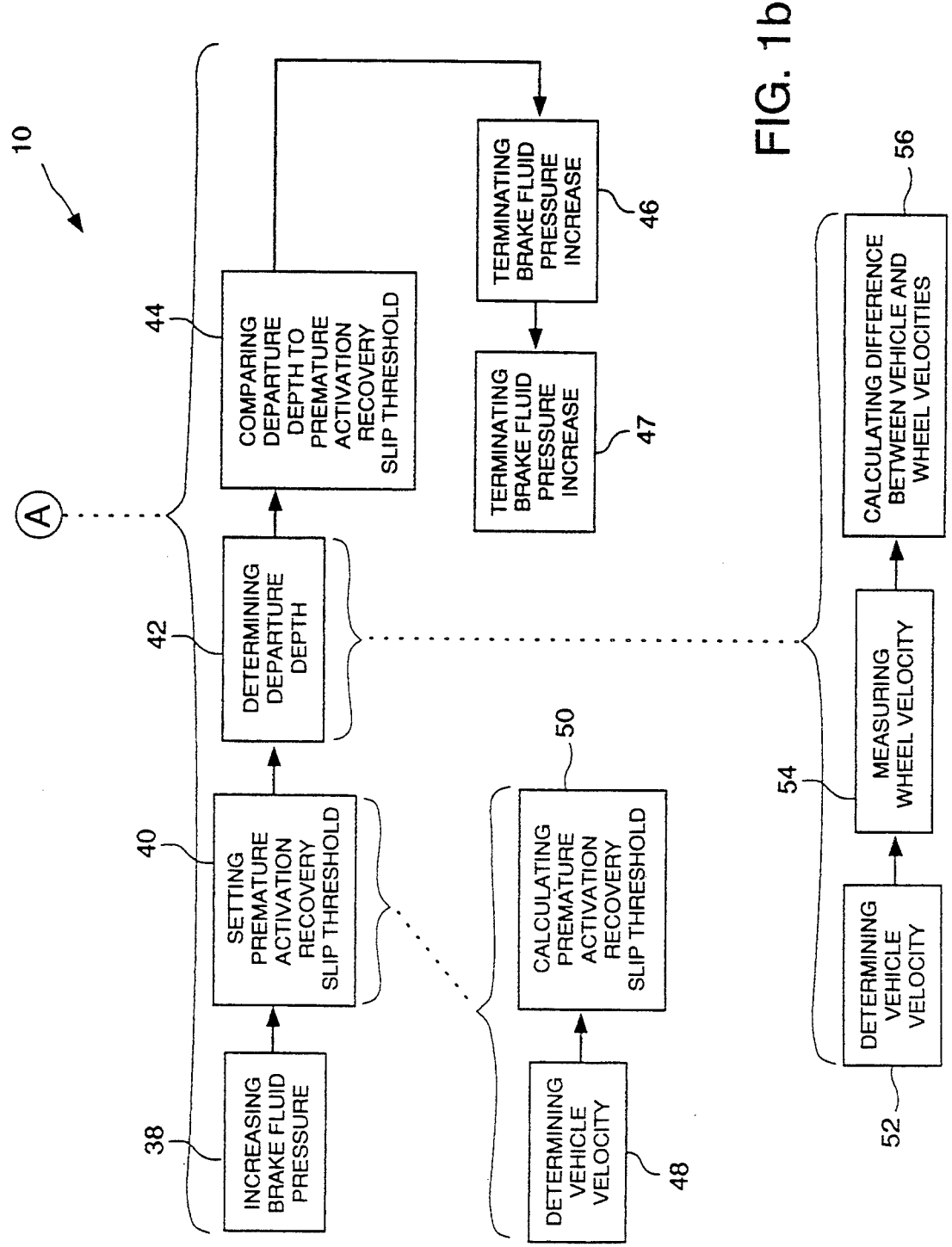

EARLY ACTIVATION RECOVERY CONTROL METHOD AND SYSTEM FOR VEHICLE ANTI-LOCK BRAKE SYSTEM

TECHNICAL FIELD

This invention relates generally to vehicle anti-lock brake systems. More particularly, this invention relates to an early activation recovery control method and system for vehicle anti-lock brake systems.

BACKGROUND ART

In an effort to protect vehicle operators and occupants, vehicle manufacturers and their suppliers are increasingly designing and manufacturing vehicles with additional and improved safety features. One such safety feature that has been incorporated into a number of vehicle types is anti-lock braking, which can take a variety of forms.

Vehicle anti-lock brake systems are designed to maximize the ability of a vehicle operator to bring a vehicle to a controlled stop on any type of road surface. The system accomplishes this goal by preventing the vehicle brakes from prematurely halting vehicle wheel rotation, or "locking" the vehicle wheels, regardless of the road surface and the pressure applied to the brake pedal by the vehicle operator.

Typical vehicle anti-lock brake systems comprise a vehicle wheel speed sensor for providing input to an anti-lock brake system control unit. The control unit controls an anti-lock brake system control valve interposed between the brake master cylinder and the individual wheel brakes of an hydraulic brake circuit. The control valve, in turn, regulates hydraulic brake fluid pressure in the individual wheel brakes to implement anti-lock braking.

In operation, the vehicle wheel speed sensor not only measures the vehicle wheel speed, but also provides input to the control unit for determining a vehicle speed. The control unit monitors the vehicle and vehicle wheel speeds for an indication of an anti-lock braking event. First, based upon the vehicle speed, the control unit typically determines a slip threshold. Using the vehicle velocity as a reference, slip threshold may be expressed as the difference between a selected velocity and the vehicle velocity.

Next, the control unit compares the vehicle wheel velocity to the vehicle velocity to determine a departure depth. Again using the vehicle velocity as a reference, departure depth may be expressed as the difference between the vehicle velocity and the wheel velocity. During normal vehicle braking, the wheel velocity closely matches the vehicle velocity. Thus, during normal vehicle braking, the difference between the vehicle velocity and the wheel velocity is nominal.

However, during an anti-lock braking event, the wheel velocity decreases significantly below, or "departs" from, the vehicle reference velocity. In such a situation, as for example during hard braking on an ice covered road, the frictional force between the vehicle brake pads and the vehicle wheel exceeds that between the vehicle wheel and the road surface. Uncontrolled, such a frictional force differential causes the vehicle wheel to cease rotating, or to "lock."

In turn, locking causes the vehicle wheels to slip or "skid" rather than roll, over the road surface. Such vehicle wheel skidding dramatically reduces traction and the ability of the vehicle operator to bring the vehicle to a controlled stop.

To prevent such vehicle wheel lock and the accompanying problems, the control unit of an anti-lock brake system activates the anti-lock brake system control valve to regulate hydraulic brake fluid pressure in the individual wheel brakes during an anti-lock braking event. More specifically, the control unit compares the departure depth to the slip threshold and actuates the control valve when the departure depth exceeds the slip threshold in order to isolate the individual vehicle wheel brakes in the hydraulic brake circuit from the master cylinder, thereby halting any increase in brake fluid pressure in the vehicle wheel brakes and preventing incipient vehicle wheel lock.

More particularly, when, during vehicle braking, the departure depth exceeds the slip threshold, the control valve isolates brake fluid in the individual wheel brake from the increasing brake fluid pressure in the master cylinder in order to hold brake fluid pressure in the wheel brake constant. If the isolated brake fluid pressure in the wheel brake is still high enough to cause incipient wheel lock, the anti-lock brake system then bleeds, or dumps, brake fluid from the wheel brake to reduce brake fluid pressure therein.

Thereafter, the anti-lock brake system typically holds brake fluid pressure in the wheel brake constant until such time as the departure depth no longer exceeds the slip threshold, indicating that the vehicle wheel is again travelling at or near the velocity of the vehicle. At that time, the anti-lock brake system then increases, or builds, brake fluid pressure in the wheel brake by reapplying brake fluid thereto. Reapplication of brake fluid to the wheel brake may be at a steep or gradual rate, or some combination thereof, depending upon the circumstances or the control desired.

It should be noted that to maintain smooth braking and optimum vehicle control, some reapplication of brake fluid to the wheel brakes must be undertaken where the isolation of the brake fluid in the wheel brakes from that in the master cylinder has been prolonged, for example on the order of one hundred milliseconds or greater. Such reapplication must be undertaken in order to raise brake fluid pressure in the wheel brake to a level approximating that in the master cylinder before the control valve may de-isolate the wheel brake from the master cylinder.

One problem associated with anti-lock brake systems as described above is their tendency toward false, or premature, activation. Premature activation can occur in a number of circumstances, such as where a road surface is partially ice covered or bumpy and individual vehicle wheels experience different coefficients of friction during braking. Typical anti-lock brake systems activate when the departure depth of any one of the vehicle wheels exceeds the slip threshold, despite the fact that the wheel would not have experienced excessive slip.

Moreover, typical anti-lock brake systems decrease the slip threshold after activation in order to increase anti-lock brake system sensitivity during an anti-lock braking event. Under normal conditions, this action improves the ability of the vehicle operator to slow or stop the vehicle in a controlled fashion. However, in the event of premature activation of the anti-lock brake system, such action merely compounds the problem of premature activation.

Previous attempts to solve the premature activation problem included controlling the anti-lock brake system based on the assumption that if the control valve isolated the wheel brake from the master cylinder and the anti-lock brake system did not undertake a reduction of brake fluid pressure in the wheel brake, then the anti-lock brake system had activated prematurely. However, such a technique has proven unsatisfactory in that it is possible to meet the pressure reduction criterion while still encountering premature activation of the anti-lock brake system.

DISCLOSURE OF INVENTION

According to the present invention, a control method and system are provided for a vehicle anti-lock brake system, the control method and system providing for recovery from premature activation of the vehicle anti-lock brake system. The control method comprises the steps of determining whether the anti-lock brake system has prematurely activated, and engaging a premature activation recovery control of the anti-lock brake system when the anti-lock brake system has prematurely activated.

The control system comprises a wheel speed sensor for measuring the speed of at least one vehicle wheel, and control means operatively connected to the wheel speed sensor for setting a slip threshold at a premature activation level after activation of the anti-lock brake system, determining at least one departure depth, comparing the at least one departure depth to the premature activation level of the slip threshold, setting the slip threshold at a premature activation recovery level when the at least one departure depth has failed to exceed the premature activation level of the slip threshold and begins to decrease, and comparing the at least one departure depth to the premature activation recovery level of the slip threshold. The control system further comprises signal generator means operatively connected to the control means, the signal generator means for generating a first signal operative to increase brake fluid pressure to the at least one vehicle wheel brake prematurely isolated from the master cylinder brake fluid pressure at a premature activation recovery rate when the at least one departure depth has failed to exceed the premature activation level of the slip threshold and begins to decrease, generating a second signal operative to terminate the premature activation recovery rate of brake fluid pressure increase to the at least one vehicle wheel brake prematurely isolated from the master cylinder brake fluid pressure when the at least one departure depth exceeds the premature activation recovery level of the slip threshold, and generating a third signal operative to terminate the premature activation recovery rate of brake fluid pressure increase to the at least one vehicle wheel brake after a preselected period of time.

Accordingly, it is the principle object of the present invention to provide an improved control method and system for a vehicle anti-lock brake system.

Another object of the present invention is to provide an improved control method and system for a vehicle anti-lock brake system that provides for recovery from premature activation of the anti-lock brake system.

These and other objects and advantages will be readily apparent upon consideration of the following description and drawings.

BEST MODE FOR CARRYING OUT THE INVENTION

Figure 1A:
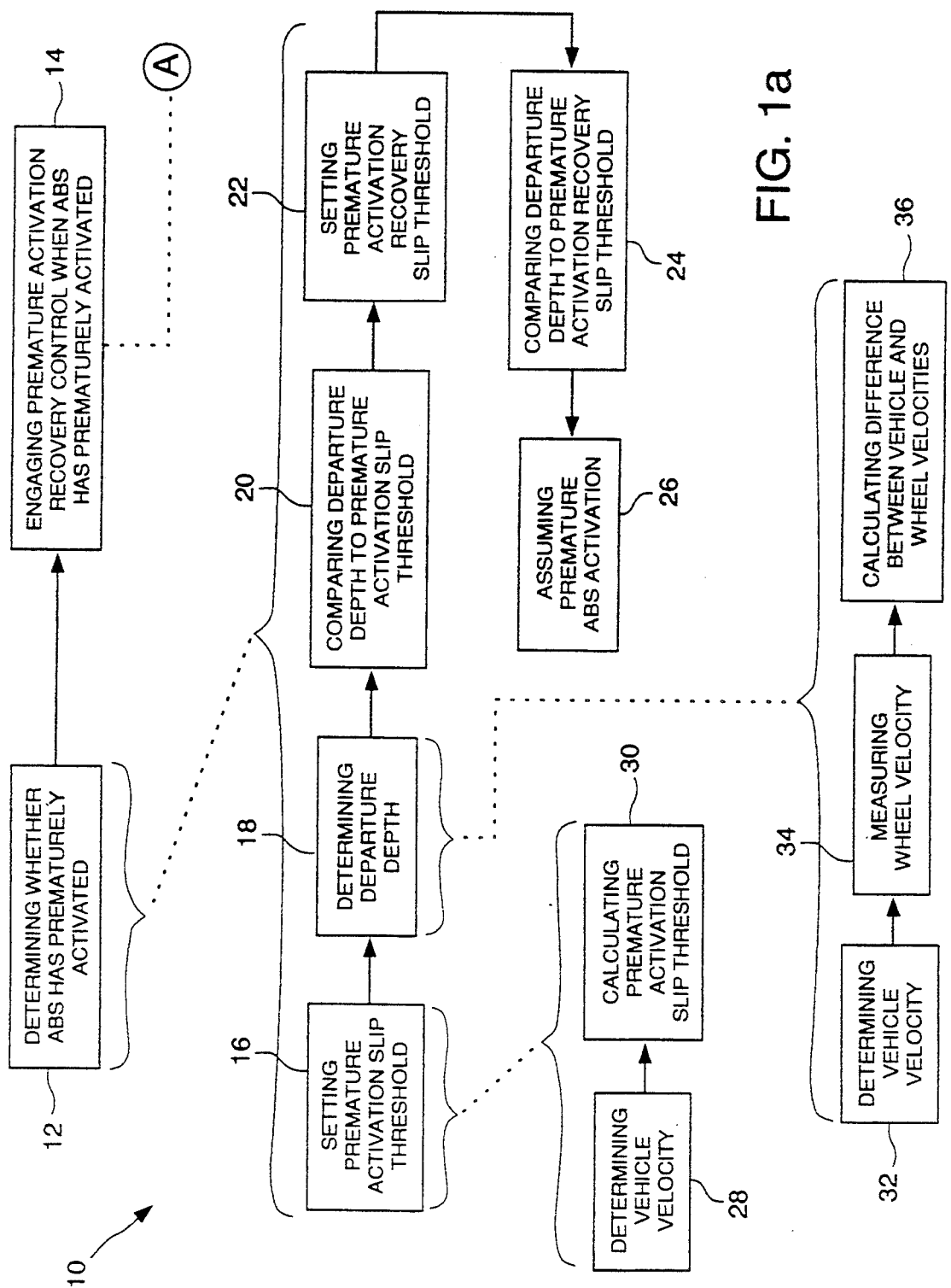
FIG. 1 is a block diagram of the control method of the present invention.

Referring now to FIG. 1, the control method of the present invention is show in block diagram form, denoted generally by reference numeral 10. According to the general aspects of the present invention, the control method 10 assumes that the anti-lock brake system has activated prematurely until determining otherwise. Until such time, a premature activation recovery control of the anti-lock brake system is engaged. Once the control method 10 determines that the anti-lock brake system has not activated prematurely, a normal control of the anti-lock brake system is engaged.

As used herein, premature activation control of the anti-lock brake system is defined in terms of normal control of the anti-lock brake system. Normal control is defined as activation of the anti-lock brake system when either of the departure depths associated with each of the two front vehicle wheels exceeds a slip threshold having a normal operation level. The normal operation level of the slip threshold is defined as that slip threshold providing for the most effective operation of the anti-lock brake system, based on experience.

In a similar fashion, premature activation recovery control of the vehicle anti-lock brake system is defined as a control of the vehicle anti-lock brake system when both of the departure depths associated with each of the two front vehicle wheels fail to exceed a slip threshold having a premature activation level, and both departure depths begin to decrease. As previously described, a slip threshold may be expressed as the difference between the vehicle reference velocity and a selected velocity. Thus, the premature activation level of the slip threshold is defined as a slip threshold level greater than the normal operation level of the slip threshold.

More specifically, after the vehicle anti-lock brake system has activated in response to either or both of the departure depths associated with the front two vehicle wheels exceeding the normal activation level of the slip threshold, the control method 10 of the present invention assumes such activation to be premature until such time as either departure depth also exceeds the premature activation level of the slip threshold. At such a time, activation of the anti-lock brake system is determined not to have been premature and normal control of the anti-lock brake system continues.

However, if both departure depths fail to exceed the premature activation level of the slip threshold and begin to decrease, indicating the need for building pressure in the front wheel brake through reapplication of brake fluid thereto, activation of the anti-lock brake system is determined to have been premature. In that event, the control method 10 of the present invention engages premature activation recovery control of the anti-lock brake system, thereby bypassing normal control.

During premature activation recovery control of the anti-lock brake system, both of the two front wheel brakes experience an aggressive brake fluid pressure buildup intended to quickly raise brake fluid pressure therein to a level appropriate for the existing road surface. Such a pressure buildup is terminated when a significant departure depth is experienced associated with either of the two front wheels, or after a preselected time period elapses.

As described generally above, the control method 10 of the present invention provides for recovery from premature activation of a vehicle anti-lock brake system. More specifically, as seen in FIG. 1, the control method 10 comprises the steps of determining 12 whether the anti-lock brake system has prematurely activated, and engaging 14 a premature activation recovery control of the anti-lock brake system when the anti-lock brake system has prematurely activated.

The step of determining 12 whether the anti-lock brake system has prematurely activated itself comprises the steps of setting 16 a slip threshold at a premature activation level after activation of the anti-lock brake system, determining 18 at least one departure depth, and comparing 20 the at least one departure depth to the premature activation level of the slip threshold. The step of determining 12 whether the anti-lock brake system has prematurely activated further comprises the steps of setting 22 the slip threshold at a premature activation recovery level when the at least one departure depth has failed to exceed the premature activation level of the slip threshold and begins to decrease, comparing 24 the at least one departure depth to the premature activation recovery level of the slip threshold, and assuming 26 premature activation of the anti-lock brake system when the at least one departure depth fails to exceed the premature activation recovery level of the slip threshold.

As previously described, a slip threshold may be expressed as the difference between the vehicle velocity and a selected velocity. Thus, the step of setting 16 a slip threshold at a premature activation level itself comprises the steps of determining a 28 vehicle velocity, and calculating 30 the premature activation level of the slip threshold based on the vehicle velocity. More specifically, as is well known in the art, the vehicle velocity can be determined based upon the history of wheel velocity information provided by wheel speed sensors, which are described more particularly below in conjunction with the control system of the present invention. A premature activation slip threshold level can then be determined by calculating the difference between the vehicle velocity and a selected velocity less than the vehicle velocity.

As also described previously, a departure depth may be expressed as the difference between the vehicle velocity and the wheel velocity. Thus, the step of determining 18 at least one departure depth itself comprises the steps of determining 32 a vehicle velocity, measuring 34 at least one vehicle wheel velocity, and calculating 36 the difference between the vehicle velocity and the at least one wheel velocity. In determining 18 the at least one departure depth, a wheel speed sensor, described in greater detail below in conjunction with the control system of the present invention, provides wheel speed information history which can also be used to determine the vehicle velocity.

Still referring to FIG. 1, the step of engaging 14 a premature activation recovery control of the anti-lock brake system itself comprises the steps of increasing 38 brake fluid pressure to at least one vehicle wheel brake prematurely isolated from a master cylinder brake fluid pressure at a premature activation recovery rate, setting 40 the slip threshold at a premature activation recovery level, determining 42 at least one departure depth, comparing 44 the at least one departure depth to the premature activation recovery level of the slip threshold, terminating 46 the premature activation recovery rate of brake fluid pressure increase to the at least one vehicle wheel brake when the at least one departure depth exceeds the premature activation recovery level of the slip threshold, and terminating 47 the premature activation recovery rate of the brake fluid pressure increase to the at least one vehicle wheel brake after a preselected period of time.

The step of setting 36 the slip threshold at a premature activation recovery level itself comprises the steps of determining 48 a vehicle velocity, and calculating 50 the premature activation recovery level of the slip threshold based on the vehicle velocity. Finally, the step of determining 38 at least one departure depth itself comprises the steps of determining 52 a vehicle velocity, measuring 54 at least one vehicle wheel velocity, and calculating 56 the difference between the vehicle velocity and the at least one wheel velocity.

Figure 3:
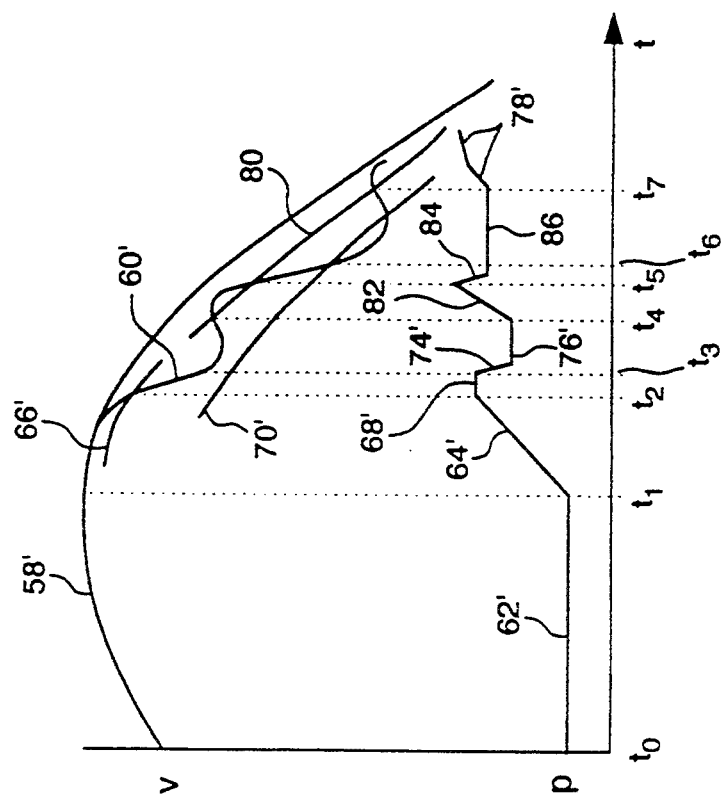
FIG. 3 is a graph of a vehicle and a wheel velocity, as well as brake fluid pressure levels over time during premature activation of the anti-lock brake system.
Figure 2:
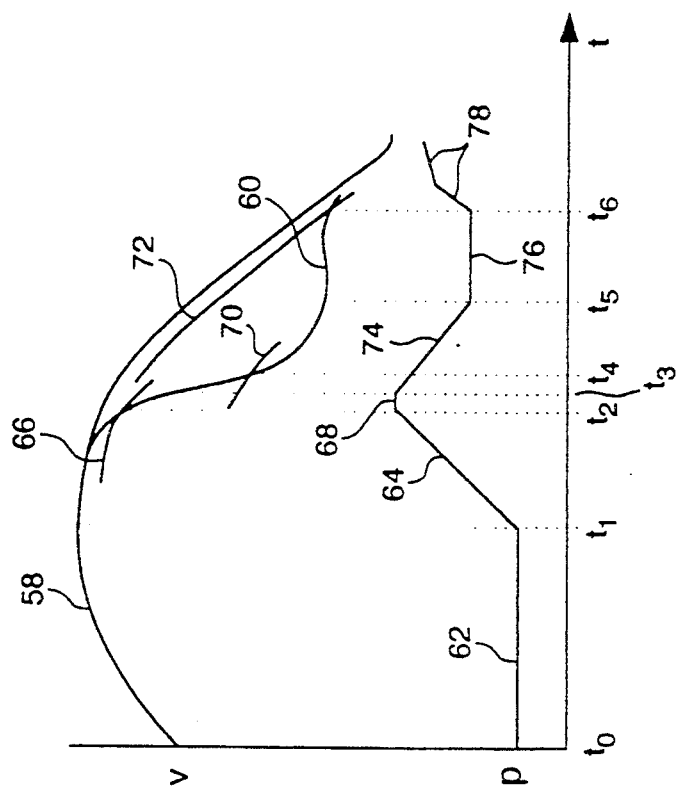
FIG. 2 is graph of a vehicle and a wheel velocity, as well as brake fluid pressure levels over time during an ordinary anti-lock braking event.

Referring now to FIGS. 2 and 3, graphs of a vehicle and a wheel velocity, as well as brake fluid pressure levels in a brake associated with the wheel, are shown during an ordinary anti-lock braking event and during premature activation of the anti-lock brake system, respectively. More specifically, FIGS. 2 and 3, respectively, depict normal and premature activation recovery control of an anti-lock brake system.

As seen in FIG. 2, while both vehicle velocity 58 and wheel velocity 60 increase between time $t_0$ and $t_1$, wheel brake pressure remains static 62. At time $t_1$, the vehicle operator begins braking the vehicle. Both vehicle and wheel velocities 58, 60 begin to decrease in response to increasing brake pressure as the wheel brake is applied 64.

At time $t_2$, wheel velocity 60 has begun to decrease more rapidly than vehicle velocity 58, creating a departure depth. The departure depth having exceeded the normal operation level of the slip threshold 66, the anti-lock brake system is activated to isolate the wheel brake from the master cylinder such that brake pressure remains at a constant isolation level 68.

Subsequently, at time $t_3$, brake fluid is bled, or dumped, from the wheel brake to decrease brake fluid pressure 74. Thereafter, at $t_3$ brake fluid pressure in the wheel brake may again be held constant 76. Such action is taken to prevent incipient wheel lock as the departure depth of the wheel velocity 60 continues to increase.

In the interim, at time $t_4$, the departure depth of the wheel velocity 60 has exceeded the premature activation level of the slip threshold 70. As a result, the control method 10 of the present invention determines that the previous activation of the anti-lock brake system was not premature and normal control of the anti-lock brake system continues. The slip threshold is also decreased to a high sensitivity level 72 to further improve anti-lock brake system performance.

Finally, at time $t_6$, the departure of the wheel velocity 60 from the vehicle velocity 58 is nearing recovery. Accordingly, brake fluid is re-applied to the wheel brake in order to increase brake fluid pressure therein 78. As previously stated, the rate of pressure buildup during re-application of brake fluid to the wheel brake may be steep, gradual, or some combination of both.

As with normal control, during premature activation recovery control of the anti-lock brake system shown in FIG. 3, while both vehicle velocity 58' and wheel velocity 60' increase between time $t_0$ and $t_1$, wheel brake pressure remains static 62'. At time $t_1$, the vehicle operator begins braking the vehicle. Both vehicle and wheel velocities 58', 60' begin to decrease in response to increasing brake fluid pressure as the wheel brake is applied 64'.

At time $t_2$, wheel velocity 60' has begun to decrease more rapidly than vehicle velocity 58', creating a departure depth. The departure depth having exceeded the normal operation level of the slip threshold 66', the anti-lock brake system is activated to isolate the wheel brake from the master cylinder such that wheel brake fluid pressure remains at a constant isolation level 68'.

Subsequently, at time $t_3$, brake fluid is bled, or dumped, from the wheel brake to decrease brake fluid pressure 74'. Immediately thereafter, brake fluid pressure in the wheel brake may again be held constant 76'. Such action is taken to prevent incipient wheel lock as the departure depth of the wheel velocity 60' continues to increase.

However, after time $t_3$, the departure depth of the wheel velocity 60' begins to decrease, failing to exceed the premature activation level of the slip threshold 70'. As a result, the slip threshold is set at a premature activation recovery level 80. Typically, the premature activation recovery level of the slip threshold 80 is equal to that of the normal operation level of the slip threshold 66'.

At time $t_4$, the departure depth of the wheel velocity 60' has decreased such that it no longer exceeds the premature activation level of the slip threshold 80. As a result, the control method 10 of the present invention determines that the previous activation of the anti-lock brake system was premature and normal control of the anti-lock brake system is bypassed.

Thus, at time $t_4$, the control method 10 of the present invention undertakes an aggressive brake fluid pressure buildup in the wheel brake at a premature activation recovery rate 82 to restore the brake fluid pressure to the wheel brake necessary for regular braking. The premature activation recovery rate of pressure buildup 82 is a selected rate greater than the averaged rate of pressure buildup 78 during re-application of brake fluid to the wheel brake in normal control of the anti-lock brake system.

This aggressive brake fluid pressure buildup 82 in the wheel brake continues until such time as either a preselected period of time elapses or, due to the increasing pressure, the departure depth of the wheel velocity 60' exceeds the premature activation recovery level of the slip threshold 80. Thus, as seen in FIG. 3, at time $t_5$ the departure depth of the wheel velocity 60' has exceeded the premature activation recovery level of the slip threshold 80. As a result, the aggressive brake fluid pressure buildup 82 is terminated by dumping brake fluid from the wheel brake to decrease brake fluid pressure 84, and subsequently holding brake fluid pressure constant 86.

Thereafter, if the departure depth of the wheel velocity 60' continues to increase such that it exceeds the premature activation level of the slip threshold 70', normal control of the anti-lock brake system is restored. If, however, the departure depth of the wheel velocity 60' again fails to exceed the premature activation level of the slip threshold 70', the sequence described above is repeated.

Thus, as shown in FIG. 3, at time $t_6$ the departure depth of the wheel velocity 60' has exceeded the premature activation level of the slip threshold 70'. As a result, normal control of the anti-lock brake system is restored such that, at time $t_7$, when the departure of the wheel velocity 60' is nearing recovery, brake fluid is re-applied to the wheel brake to increase brake fluid pressure therein 78'.

Figure 4:
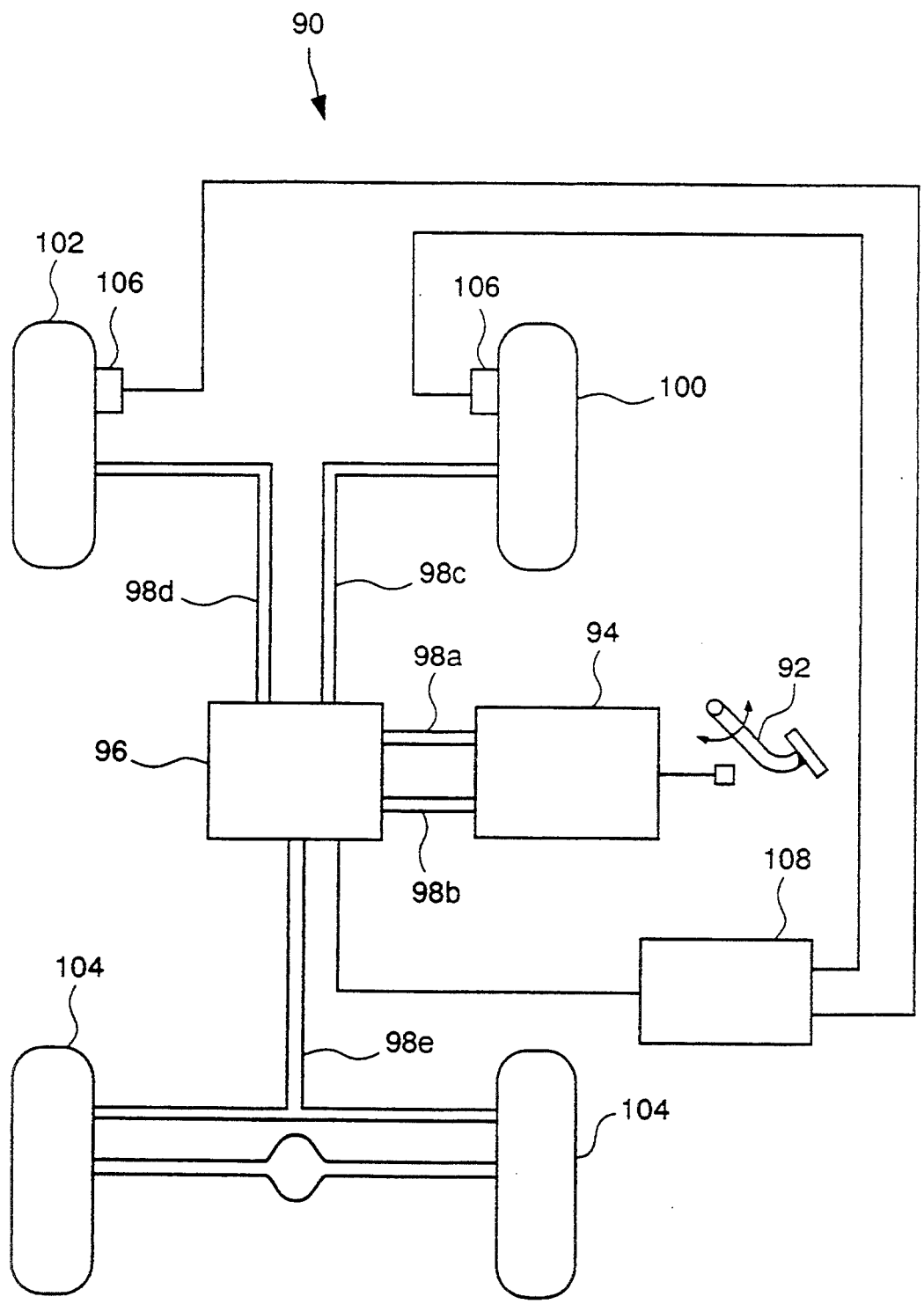
FIG. 4 is a schematic diagram of the control system of the present invention.

Referring now to FIG. 4, a schematic diagram of the control system of the present invention is shown, denoted generally by reference numeral 90, in conjunction with an ordinary passenger vehicle anti-lock brake system. The anti-lock brake system includes a brake pedal 92, brake master cylinder 94, control valve 96, brake fluid conduit 98a, 98b, 98c, 98d and 98e, as well as right front wheel 100, left front wheel 102, and a pair of rear wheels 104.

The control system 90 of the present invention comprises a pair of vehicle wheel speed sensors 106 for measuring the velocity of each of the front wheels 100, 102. The control system 90 further comprises an anti-lock brake system control unit 108. Each of the wheel sensors 106 are operatively connected to the control unit 108, which is itself operatively connected to the anti-lock brake system control valve 96. Such operative connections are preferably electrical, but may also be other types of connections, such as fiber optic.

As is well known in the art, each of the wheel speed sensors 106 may comprise a stationary variable reluctance sensor (not shown) positioned adjacent a toothed wheel (not shown) which rotates with its respective vehicle wheel 100, 102. The variable reluctance sensors each generate a pulsed signal whose frequency varies directly with the speed of the respective vehicle wheels 100, 102. Other well known wheel speed sensor configurations may also be employed.

The control unit 108 takes the form of a commercially available microprocessor. Once programmed, the microprocessor control unit 108 functions as control means for setting a slip threshold at a premature activation level after activation of the anti-lock brake system, determining at least one departure depth, comparing the at least one departure depth to the premature activation level of the slip threshold, setting the slip threshold at a premature activation recovery level when the at least one departure depth has failed to exceed the premature activation level of the slip threshold and begins to decrease, and comparing the at least one departure depth to the premature activation recovery level of the slip threshold.

The control unit 108 also functions as signal generator means for generating a first signal operative to increase brake fluid pressure to the at least one vehicle wheel brake prematurely isolated from the master cylinder brake fluid pressure at a premature activation recovery rate when the at least one departure depth has failed to exceed the premature activation level of the slip threshold and begins to decrease, generating a second signal operative to terminate the premature activation recovery rate of brake fluid pressure increase to the at least one vehicle wheel brake prematurely isolated from the master cylinder brake fluid pressure when the at least one departure depth exceeds the premature activation recovery level of the slip threshold, and generating a third signal operative to terminate the premature activation recovery rate of brake fluid pressure increase to the at least one vehicle wheel brake after a preselected period of time.

As previously stated, to engage premature activation recovery control of the anti-lock brake system, the control unit 108 is operatively connected to the anti-lock brake system control valve 96. It is the control valve 96 which provides for regulation of the brake fluid from the master cylinder 94 to the individual wheel brakes (not shown) of each of the wheels 100, 102 via the brake fluid conduits 98a, 98b, 98c, and 98d.

The control method 10 and system 90 of the present invention have been described and shown herein as applied to the two front wheels of an ordinary passenger vehicle anti-lock brake system. However, it should be readily apparent to one of ordinary skill in the art that the control method 10 and system 90 of the present invention are suitable for use in any vehicle wherein an anti-lock brake system may be required, and may be applied to any number of vehicle wheels.

It is to be understood that the present invention has been described in an illustrative manner and the terminology which has been used is intended to be in the nature of words of description rather than of limitation. Obviously, many modifications and variations of the present invention are possible in light of the above teachings. Therefore, it is also to be understood that, within the scope of the following claims, the invention may be practiced otherwise than as specifically described.

What is claimed is:

1. A control method for a vehicle anti-lock brake system, the method providing for recovery from premature activation of the vehicle anti-lock brake system, the method comprising:
  generating an input signal representing at least one vehicle wheel velocity;
  activating the anti-lock brake system;
  processing the input signal to determine whether the anti-lock brake system has prematurely activated, wherein processing the input signal includes;
  setting a slip threshold at a premature activation level;
  determining at least one departure depth;
  comparing the at least one departure depth to the premature activation level of the slip threshold;
  setting the slip threshold at a premature activation recovery level when the at least one departure depth has failed to exceed the premature activation level of the slip threshold and begins to decrease;
  comparing the at least one departure depth to the premature activation recovery level of the slip threshold; and
  determining premature activation of the anti-lock brake system when the at least one departure depth fails to exceed the premature activation recovery level of the slip threshold;
  generating a premature activation recovery control signal when the anti-lock brake system has prematurely activated; and
  performing premature activation recovery control of the anti-lock brake system in response to the premature activation recovery control signal.

2. The control method of claim 1 wherein setting a slip threshold at a premature activation level comprises:
  determining a vehicle velocity; and
  determining the premature activation level of the slip threshold based on the vehicle velocity.

3. The control method of claim 1 wherein determining at least one departure depth comprises;
  determining a vehicle velocity; and
  determining the difference between the vehicle velocity and the at least one vehicle wheel velocity.

4. The control method of claim 1 wherein setting the slip threshold at a premature activation recovery level comprises:
  determining a vehicle velocity; and
  determining the premature activation recovery level of the slip threshold based on the vehicle velocity.

5. The control method of claim 1 wherein performing premature activation recovery control comprises:
  increasing brake fluid pressure to at least one vehicle wheel brake prematurely isolated from a master cylinder brake fluid pressure at a premature activation recovery rate; and
  terminating the premature activation recovery rate of brake fluid pressure increase to the at least one vehicle wheel brake when the at least one departure depth exceeds the premature activation recovery level of the slip threshold.

6. The control method of claim 5 wherein performing premature activation recovery control further comprises:
  comparing the at least one departure depth to the premature activation recovery level of the slip threshold; and
  terminating the premature activation recovery rate of brake fluid pressure increase to the at least one vehicle wheel brake when the at least one departure depth exceeds the premature activation recovery level of the slip threshold.

7. The control method of claim 6 wherein performing premature activation recovery control further comprises terminating the premature activation recovery rate of brake fluid pressure increase to the at least one vehicle wheel brake after a preselected period of time.

8. The control method of claim 5 wherein setting the slip threshold at a premature activation recovery level comprises:
  determining a vehicle velocity; and
  determining the premature activation recovery level of the slip threshold based on the vehicle velocity.

9. The control method of claim 5 wherein determining at least one departure depth comprises:
  determining a vehicle velocity; and
  determining the difference between the vehicle velocity and the at least one vehicle wheel velocity.

10. A control method for a vehicle anti-lock brake system, the method providing for recovery from premature activation of the anti-lock brake system wherein at least one vehicle wheel is prematurely isolated from a master cylinder brake fluid pressure, the method comprising:
  generating an input signal representing at least one vehicle wheel velocity;
  processing the input signal to determine a vehicle velocity;
  activating the anti-lock brake system; setting a slip threshold at a premature activation level based on the vehicle velocity after activation of the anti-lock brake system;
  determining at least one departure depth;

comparing the at least one departure depth to the premature activation level of the slip threshold;

setting the slip threshold at a premature activation recovery level based on the vehicle velocity when the at least one departure depth has failed to exceed the premature activation level of the slip threshold and begins to decrease;

comparing the at least owe departure depth to the premature activation recovery level of the slip threshold;

generating a premature activation recovery control signal when the at least one departure depth fails to exceed the premature activation recovery level of the slip threshold; and performing premature activation recovery control of the anti-lock brake system in response to the premature activation recovery control signal.

11. The control method of claim 10 wherein performing premature activation recovery control comprises:
increasing brake fluid pressure to at least one vehicle wheel brake prematurely isolated from a master cylinder brake fluid pressure at a premature activation recovery rate;
setting the slip threshold at a premature activation recovery level; and
determining at least one departure depth.

12. The control method of claim 11 wherein performing premature activation recovery control further comprises:
comparing the at least one departure depth to the premature activation recovery level of the slip threshold; and
terminating the premature activation recovery rate of brake fluid pressure increase to the at least one vehicle wheel brake when the at least one departure depth exceeds the premature activation recovery level of the slip threshold; and
terminating the premature activation recovery rate of brake fluid pressure increase to the at least one vehicle wheel brake after a preselected period of time.

13. A control system for a vehicle anti-lock brake system, the system providing for recovery from premature activation of the vehicle anti-lock brake system, the system comprising:
means for generating an input signal representing at least one vehicle wheel velocity;
means for activating the anti-lock brake systems.
means for processing the input signal to determine whether the anti-lock brake system has prematurely activated, wherein the means for processing the input signal includes;

means for setting a slip threshold at a premature activation level;
means for determining at least one departure depth;
means for comparing the at least one departure depth to the premature activation level of the slip threshold;
means for setting the slip threshold at a premature activation recovery level when the at least one departure depth has failed to exceed the premature activation level of the slip threshold and begins to decrease;
means for comparing the at least one departure depth to the premature activation recovery level of the slip threshold; and
means for determining premature activation of the anti-lock brake system when the at least one departure depth fails to exceed the premature activation recovery level of the slip threshold;
means for generating a premature activation recovery control signal when the anti-lock brake system has prematurely activated; and
means for performing premature activation recovery control of the anti-lock brake system in response to the premature activation recovery control signal.

14. The control system of claim 13 wherein the means for performing premature activation recovery control comprises:
means for increasing brake fluid pressure to at least one vehicle wheel brake prematurely isolated from a master cylinder brake fluid pressure at a premature activation recovery rate; and
means for terminating the premature activation recovery rate of brake fluid pressure increase to the at least one vehicle wheel brake when the at least one departure depth exceeds the premature activation recovery level of the slip threshold.

15. The control system of claim 14 wherein the means for performing premature activation recovery control further comprises:
means for comparing the at least one departure depth to the premature activation recovery level of the slip threshold; and
means for terminating the premature activation recovery rate of brake fluid pressure increase to the at least one vehicle wheel brake when the at least one departure depth exceeds the premature activation recovery level of the slip threshold.

16. The control system of claim 15 wherein the means for performing premature activation recovery control further comprises means for terminating the premature activation recovery rate of brake fluid pressure increase to the at least one vehicle wheel brake after a preselected period of time.

* * * * *